United States Patent
Kuo et al.

(10) Patent No.: US 8,383,303 B2
(45) Date of Patent: Feb. 26, 2013

(54) COLOR FILTER PLATE

(75) Inventors: Yi-Peng Kuo, Taoyuan (TW); Wen-Jen Hsieh, Taoyuan (TW); Ying-Hung Chuang, Taoyuan (TW)

(73) Assignee: Chunghwa Picture Tubes, Ltd., Padeh, Taoyuan (TW)

( * ) Notice: Subject to any disclaimer, the term of this patent is extended or adjusted under 35 U.S.C. 154(b) by 234 days.

(21) Appl. No.: 13/029,544

(22) Filed: Feb. 17, 2011

(65) Prior Publication Data

US 2012/0147492 A1 Jun. 14, 2012

(30) Foreign Application Priority Data

Dec. 10, 2010 (TW) ................................ 99143268 A

(51) Int. Cl.
*G02B 5/20* (2006.01)
(52) U.S. Cl. ........................................... 430/7; 349/129
(58) Field of Classification Search .................. None
See application file for complete search history.

(56) References Cited

U.S. PATENT DOCUMENTS

| | | |
|---|---|---|
| 5,811,219 A | 9/1998 | No et al. |
| 2008/0111961 A1 * | 5/2008 | Tien et al. ..................... 349/129 |

FOREIGN PATENT DOCUMENTS

| | | | |
|---|---|---|---|
| JP | 2002-122858 A | * | 4/2002 |
| JP | 2008-203748 A | * | 9/2008 |
| TW | I228641 | | 3/2005 |

OTHER PUBLICATIONS

Computer-generated transaltion of JP 2008-203748 (Sep. 2008).*
Computer-generated transaltion of JP 2002-122858 (Feb. 2002).*

* cited by examiner

*Primary Examiner* — John A. McPherson
(74) *Attorney, Agent, or Firm* — Muncy, Geissler, Olds & Lowe, PLLC

(57) ABSTRACT

A color filter includes a transparent substrate, a transparent conductive layer, a plurality of filter layers, and a plurality of bumps. The filter layers are disposed between the transparent substrate and the transparent conductive layer, and the bumps are disposed on a plane of the transparent conductive layer. A sheet resistance of each of the bumps is above $10^{14}\Omega/\square$, and an optical density (OD) of each of the bumps is above 1.5.

12 Claims, 1 Drawing Sheet

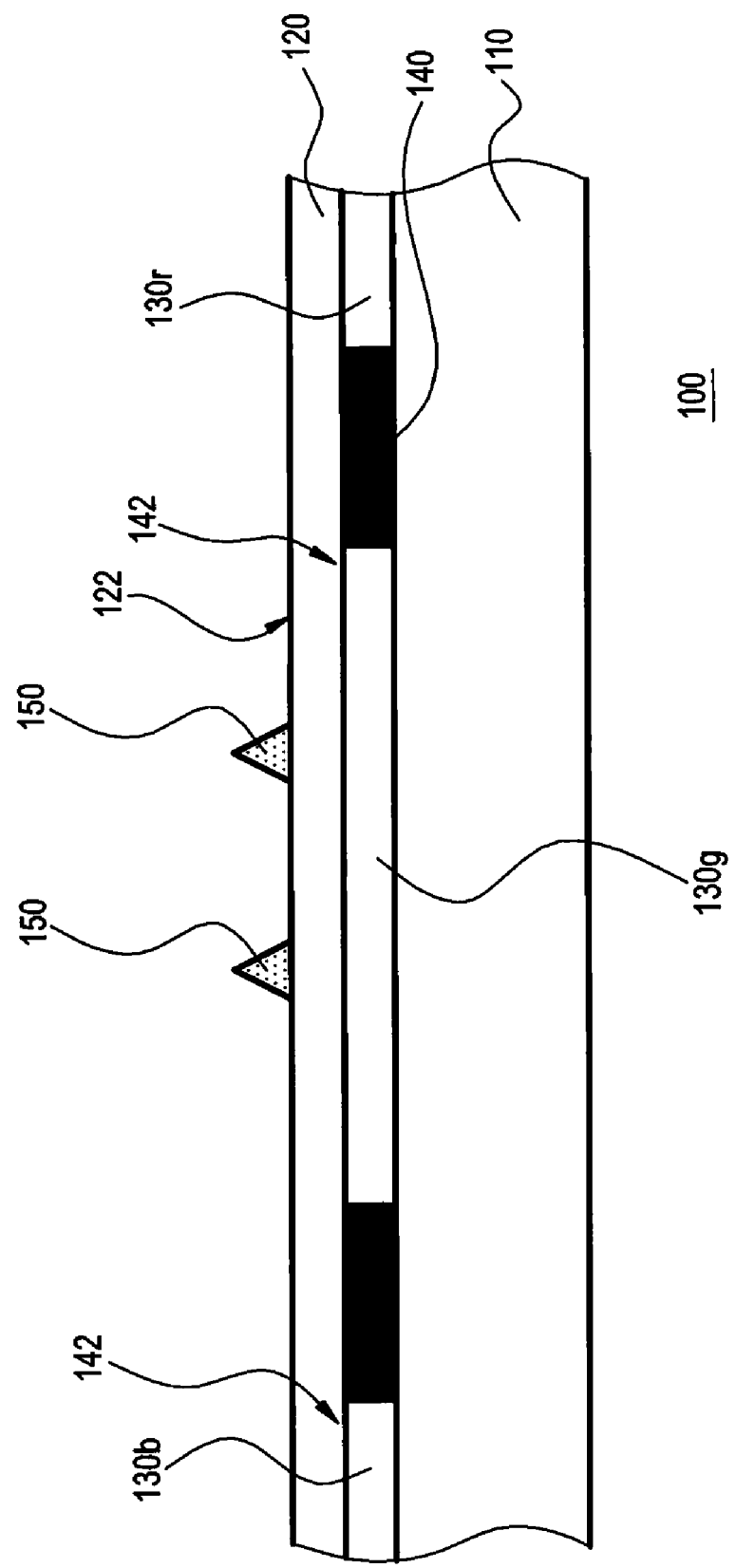

COLOR FILTER PLATE

CROSS-REFERENCE TO RELATED APPLICATION

This application claims the benefit of Taiwan Patent Application No. 099143268, filed on Dec. 10, 2010, which is hereby incorporated by reference for all purposes as if fully set forth herein.

BACKGROUND OF THE INVENTION

1. Field of Invention

The present invention relates to a liquid crystal display (LCD), and more particularly to a color filter plate.

2. Related Art

An LCD is a mainstream product in the current display market, and a color filter plate is a common element in the LCD. The color filter plate can filter light from a backlight source and allow light with a certain wavelength to pass through. For example, ordinary color filter plate can allow red light, blue light, and green light to pass through. Thus, the LCD can display color images.

There are many types of LCDs, and one of which is a vertical alignment (VA) LCD. In an existing vertical alignment LCD, a color filter plate having a plurality of black bumps has emerged. The black bumps can reduce brightness in dark state and thus can enhance the contrast of the LCD.

A main material that enables the black bumps to present black is generally a carbon particle. The more carbon particles a black bump contains, the closer the color of the black bump is to black, and the more the contrast of the LCD is enhanced. Moreover, the carbon particle has a low resistance, and therefore, the more carbon particles the black bump contains, the lower the sheet resistance of the black bump becomes.

SUMMARY OF THE INVENTION

Accordingly, the present invention is directed to a color filter plate enabling to enhance the contrast of an LCD.

The present invention provides a color filter plate including a transparent substrate, a transparent conductive layer, a plurality of filter layers and a plurality of bumps. The filter layers are disposed between the transparent substrate and the transparent conductive layer, and the bumps are disposed on a plane of the transparent conductive layer. A sheet resistance of each of the bumps is above $10^{14}\Omega/\square$ (ohms per square), and an optical density (OD) of each of the bumps is above 1.5.

Since the bumps included by the color filter plate in the present invention have the OD of above 1.5, the bumps enable to enhance the contrast of the LCD.

In order to make the aforementioned features and advantages of the present invention more comprehensible, embodiments accompanied with figures are described in detail below.

BRIEF DESCRIPTION OF THE DRAWINGS

The present invention will become more fully understood from the detailed description given herein below for illustration only, and thus are not limitative of the present invention, and wherein:

FIG. 1 is a schematic sectional view of a color filter plate according to an embodiment in the present invention.

DETAILED DESCRIPTION OF THE INVENTION

FIG. 1 is a schematic sectional view of a color filter plate according to an embodiment in the present invention. Referring to FIG. 1, the color filter plate 100 is applicable to an LCD, for example, a vertical alignment LCD. The color filter plate 100 includes a transparent substrate 110, a transparent conductive layer 120 and a plurality of filter layers 130r, 130g, and 130b. The filter layers 130r, 130g, and 130b are disposed between the transparent substrate 110 and the transparent conductive layer 120. The transparent substrate 110 is, for example, a glass plate, and the transparent conductive layer 120 may be made of a transparent conductive material, such as Indium Tin Oxide (ITO) or Indium Zinc Oxide (IZO).

The filter layers 130r, 130g, and 130b all can filter light from a backlight source and allow light with a certain wavelength to pass through. For example, the filter layer 130r can allow red light to pass through, the filter layer 130g can allow green light to pass through, and the filter layer 130b can allow blue light to pass through. Accordingly, colors presented by the filter layers 130r, 130g, and 130b may be red, green and blue respectively. Moreover, the filter layers 130r, 130g, and 130b may be made of a dyed photoresist material.

In addition, the color filter plate 100 may further include a black matrix layer 140 disposed between the transparent substrate 110 and the transparent conductive layer 120. The black matrix layer 140 may be in a shape of a net, that is, the black matrix layer 140 has a plurality of lattices 142, and the filter layers 130r, 130g, and 130b are respectively disposed in the lattices 142.

According to the above, the black matrix layer 140 can cover a plurality of conductive lines and a plurality of thin-film transistors (TFTs) on a TFT array substrate (not shown), so as to avoid affecting picture quality of the LCD. The conductive lines are, for example, scanning lines and data lines.

The color filter plate 100 further includes a plurality of bumps 150, and the transparent conductive layer 120 has a plane 122. The bumps 150 are all disposed on the plane 122. An optical density (OD) of each of the bumps 150 is above 1.5 (including 1.5). For example, the OD of each of the bumps 150 may be between 1.5 and 4, or above 4 (including 4), so that in appearance, the color presented by the bump 150 may be gray or black, and the bumps 150 enable to enhance the contrast of the LCD.

When the OD of the bump 150 is between 1.5 and 4, such as 3, the color presented by the bump 150 may be gray. When the OD of the bump 150 is above 4, the color presented by the bump 150 may be black. Moreover, in this embodiment, the ODs of all of the bumps 150 may be substantially the same. In other words, the bumps 150 in the same color filter plate 100 present the same gray or black.

As for electrical properties, a sheet resistance of each of bumps 150 is above $10^{14}\Omega/\square$ (including $10^{14}\Omega/\square$), such as between $10^{14}\Omega/\square$ and $10^{17}\Omega/\square$, or between $10^{15}\Omega/\square$ and $10^{17}\Omega/\square$, so that the bump 150 has a good electrical insulating property. Moreover, a dielectric constant of each of the bumps 150 may be below 4 (including 4). For example, the dielectric constant of each of the bumps 150 is between 2 and 4, and the dielectric constant of each of the bumps 150 is between 2.5 and 3.5 in a preferred embodiment, so that the bump 150 further has a lower dielectric constant.

Many methods may be used for forming the bumps 150. In this embodiment, each of the bumps 150 may be formed by mixing a photoresist material and a plurality of pigments. The pigments may include a dark blue pigment and a dark purple pigment. The dark blue pigment and the dark purple pigment are both essentially free of low-resistance particles, such as carbon particles. Compared with conventional black bumps containing carbon particles, the bumps 150 have a higher sheet resistance each.

Coordinates of color of the dark blue pigment in a CIE xy chromaticity diagram are (xb, yb), and coordinates of color of the dark purple pigment in the CIE xy chromaticity diagram are (xp, yp), wherein $0.09 \leq xb \leq 0.22$, $0.05 \leq yb \leq 0.15$, $0.26 \leq xp \leq 0.45$, and $0.08 \leq yp \leq 0.18$. The CIE xy chromaticity diagram may be a CIE 1931 chromaticity diagram, a CIE 1960 chromaticity diagram or a CIE 1976 chromaticity diagram. Moreover, except for the dark blue pigment and the dark purple pigment, the bump 150 may also be formed by mixing a magenta pigment, a cyan pigment, and a yellow pigment, and therefore, the present invention does not limit the color of pigments used by the bump 150.

In the same bump 150, the pigments may account for below 25 wt % (including 25%) of the bump 150. The dark blue pigment may account for 15 wt % to 35 wt % based on all the pigments, and the dark purple pigment may account for 65 wt % to 85 wt % based on all the pigments. Therefore, a weight ratio of the dark purple pigment to the dark blue pigment is between 1.85 and 5.67.

Based on the above, compared with the prior art, the bumps of the color filter plate in the present invention have a higher sheet resistance and an OD of above 1.5, so that the bumps not only enable to enhance the contrast of the LCD, but also can reduce interference to arrangement of liquid crystal molecules. Thus, the present invention enables to reduce the probability of light leakage.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A color filter plate, comprising:
a transparent substrate;
a transparent conductive layer, having a plane;
a plurality of filter layers, disposed between the transparent substrate and the transparent conductive layer; and
a plurality of bumps, disposed on the plane, wherein a sheet resistance of each of the bumps is above $10^{14} \Omega/\square$, and an optical density (OD) of each of the bumps is above 1.5.

2. The color filter plate according to claim 1, further comprising a black matrix layer disposed between the transparent substrate and the transparent conductive layer.

3. The color filter plate according to claim 1, wherein the sheet resistance of each of the bumps is between $10^{14} \Omega/\square$ and $10^{17} \Omega/\square$.

4. The color filter plate according to claim 1, wherein a dielectric constant of each of the bumps is below 4.

5. The color filter plate according to claim 1, wherein the OD of each of the bumps is of above 4.

6. The color filter plate according to claim 1, wherein the OD of each of the bumps is between 1.5 and 4.

7. The color filter plate according to claim 1, wherein each of the bumps is formed by mixing a photoresist material and a plurality of pigments.

8. The color filter plate according to claim 7, wherein in the same bump, the pigments account for below 25 wt % of the bump.

9. The color filter plate according to claim 7, wherein the pigments comprise a dark blue pigment and a dark purple pigment.

10. The color filter plate according to claim 9, wherein a weight ratio of the dark purple pigment to the dark blue pigment is between 1.85 and 5.67.

11. The color filter plate according to claim 9, wherein coordinates of color of the dark blue pigment in a CIE xy chromaticity diagram are (xb, yb), where $0.09 \leq xb \leq 0.22$, and $0.05 \leq yb \leq 0.15$.

12. The color filter plate according to claim 9, wherein coordinates of color of the dark purple pigment in a CIE xy chromaticity diagram are (xp, yp), where $0.26 \leq xp \leq 0.45$, and $0.08 \leq yp \leq 0.18$.

* * * * *